W. O. FOSS.
DRIVING MECHANISM.
APPLICATION FILED FEB. 23, 1910.
1,016,987.
Patented Feb. 13, 1912.
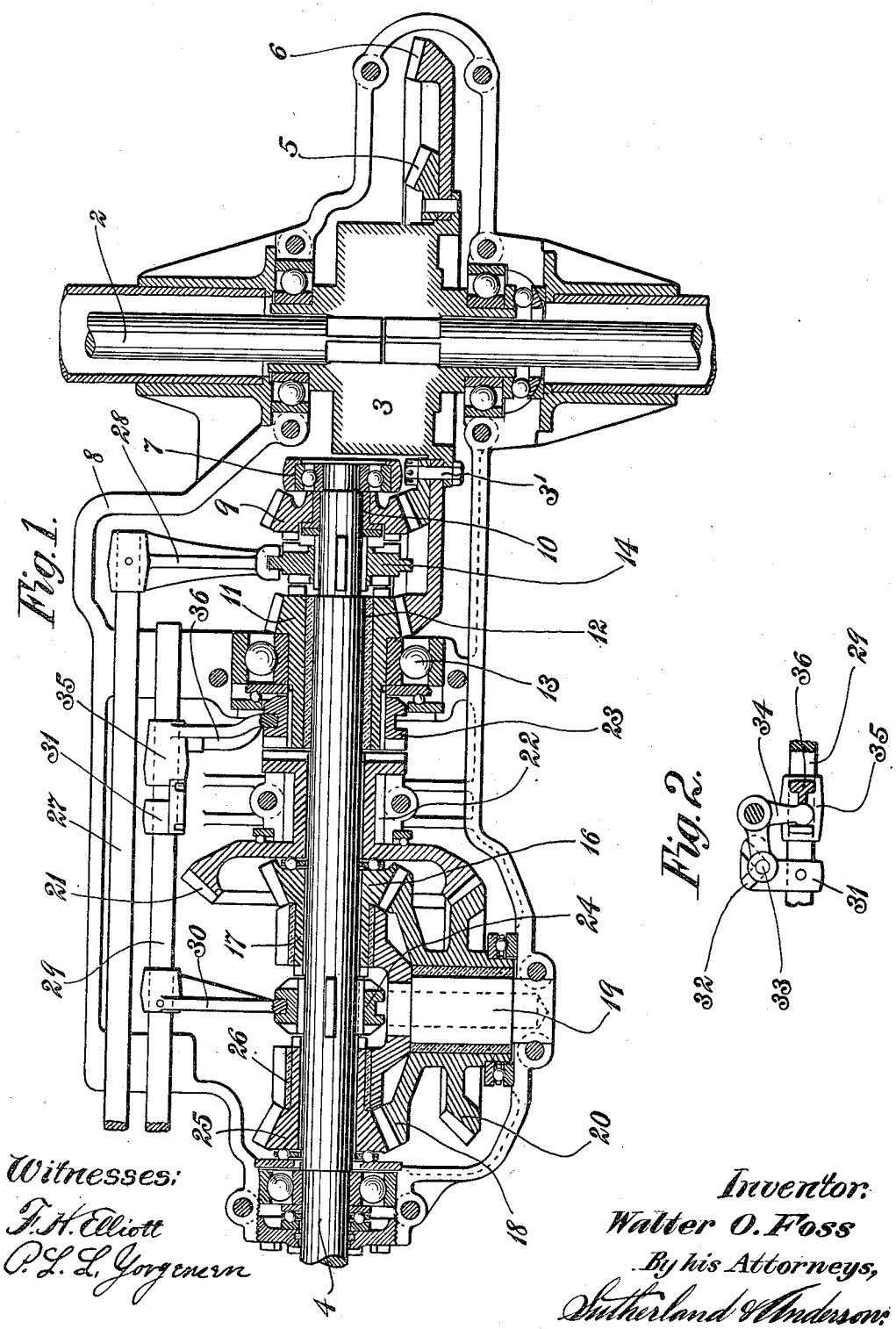
Witnesses:
F. H. Elliott
P. L. L. Jorgensen
Inventor:
Walter O. Foss
By his Attorneys,
Sutherland & Anderson

UNITED STATES PATENT OFFICE.

WALTER O. FOSS, OF NEWINGTON, CONNECTICUT, ASSIGNOR TO CHARLES E. BUNNELL AND RICHARD BRADLEY, OF BRANFORD, CONNECTICUT.

DRIVING MECHANISM.

1,016,987.  Specification of Letters Patent.  Patented Feb. 13, 1912.

Application filed February 23, 1910. Serial No. 545,410.

*To all whom it may concern:*

Be it known that I, WALTER O. FOSS, a citizen of the United States, residing at Newington, in the county of Hartford and State of Connecticut, have invented certain new and useful Improvements in Driving Mechanism, of which the following is a specification.

This invention relates to driving mechanism and while mechanism comprising my invention can be employed with advantage in many different connections it is of especial utility when incorporated in or forming part of an automobile.

One of the primary objects of the invention is to provide effective mechanism of the character indicated having means for obtaining several speeds and for also reversing and the said changes and reversal are preferably secured without the necessity of shifting any of the gears whereby a disadvantage present in automobile drives now customarily in use, is eliminated, this disadvantage being due to the shifting of the gears when it is necessary to vary the speed of the car or reverse the same.

In the drawings accompanying and forming part of the present specification I have represented in detail one convenient form of embodiment of the invention which to enable those skilled in the art to practice the invention will be fully set forth in the following description while the novelty of the invention will be included in the claims succeeding said description. From this it will be evident that I do not restrict myself to the showing made by said drawings and description for a number of changes therefrom may be adopted within the scope of my invention as expressed in said claims. For example while I prefer and actually show the gears constituting part of the mechanism as being of bevel type this is immaterial so far as the broader aspect of the invention is concerned as said gears might be of spur or other form. Bevel gears have their advantages, however, over the spur gears and for this reason I prefer to employ them.

Referring to said drawings, Figure 1 is a longitudinal sectional view of driving mechanism involving my invention. Fig. 2 is a detail view hereinafter more particularly described.

Like characters refer to like parts throughout the several figures.

As I have already indicated driving mechanism including my invention can be employed in different ways; it is shown in the drawings as constituting part of or presenting actually the "drive" of an automobile. In the present case the driving mechanism is organized for securing three speeds forward—one the high speed, another the intermediate speed, and the other the third speed, and a reverse although all these are not essential. The power as will be understood and as usual is applied to the rear axle of the car and although this axle constitutes the driving axle for the vehicle it is really the driven shaft of the mechanism.

The axle illustrated is denoted by 2 and is as usual divided, being provided with what is known as a "differential mechanism" 3 serving its usual function. As the construction of this differential and its purpose are so well known it is not necessary for me to go into detail with respect to these points, any more than to state that the power for operating the rear axle or driven shaft 2 is applied to said differential mechanism although there may be cases where I should prefer to apply the power directly to the driven shaft or axle.

In addition to the driven shaft or axle there is a driving shaft and this is generally operated by a motor directly being preferably continuously driven although this is not essential. A driving shaft such as answers my purpose is that denoted by 4 and in stating that it is driven continuously I mean that it operates at all times while the motor, of whatever type the same may be, is in action. The character of the motor may vary; it may consist of a hydrocarbon or explosive engine (not shown) having any desired number of cylinders which have their pistons operatively connected to said driving, engine or motor shaft 4 which after the usual practice may extend longitudinally of the car.

The differential mechanism 3 is shown as having rigidly connected therewith as by bolts 3' the gears 5 and 6 of bevel type, the gear 5 being of much smaller diameter than the gear 6 and said two gears as will be evident turn with said differential about the axis of the driven shaft or axle 2. Preferably the high speed mechanism involves the gear 5, and I will hereinafter explain the purpose of the gear 6.

The outer or rear end of the shaft 4 is sustained by a roller or ball bearing 7 on or constituting a part of the frame or casing 8 of the mechanism. At or near said rear end of said shaft 4 is a bevel pinion 9 in constant mesh with the bevel gear 5. Said pinion 9 is loose on said shaft 4 being clutched thereto at will by suitable means, one form of which will be hereinafter described. Said gear 9 is shown provided with a bushing 10 preferably rigidly connected therewith and which as will be evident runs loose on said shaft 4. When said pinion 9 is clutched to its supporting shaft 4 and when other gears hereinafter described are out of effective or transmitting action although they may turn, said pinion 9 will be turned so as to operate the intermeshing gear 5, and thereby the differential mechanism 3 and rear axle 2, this means being that which is employed in the present case for driving the car at its maximum forward speed.

The shaft 4 is provided with a second bevel pinion 11 the hub of which is somewhat elongated and this pinion or gear incloses the bushing 12 the two parts being rigidly connected together in some desirable manner and the bushing being loose on the shaft, from which it will be clear that said pinion 11 is also loose with respect to said shaft 2. This pinion 11 is sustained by the roller or ball bearing 13 on or constituting a part of the frame or casing 8, it being evident that said bushing 12 constitutes a second support for the shaft 4. The pinion 11 is in constant mesh with the gear 6 and like the pinion 9 can be clutched at will to the shaft 4. When the said pinion 11 is clutched to the shaft 4, the differential mechanism 3 will be driven from said shaft by the intermeshing gears 11 and 6 and owing to the large diameter of said gear 6 relative to the gear 5 the shaft or rear axle 2 will be driven at a lower speed than when the gears 9 and 5 are in power transferring relation. The gears 11 and 6 are utilized in the present case to drive the axle at its intermediate speed.

To alternately clutch the gears 9 and 11 to the shaft 4, a clutch member as 14 may be provided, said clutch member being splined to said shaft for sliding movement between said two gears 9 and 11. In Fig. 1 the said clutch member is shown as being in its intermediate or neutral position that is out of engagement with both said gears 9 and 11. When the clutch member 14 is moved to the right in said view to put the same into coupled relation with the gear 9, the axle 2 and hence the car will be driven at the maximum forward speed and when said clutch member is moved from said central position into engagement with the gear 11 the car will be driven at its intermediate forward speed. The means shown for operating said clutch member will be hereinafter described.

The two gears 11 and 6, as will now appear, constitute a part of the low speed mechanism, the power of the shaft 4 being applied to the said gear 11 through the intervention of speed-reducing and clutch mechanisms. Surrounding the shaft 4 but not necessarily in contact therewith, is a bevel pinion 16 the elongated hub of which is supported by a bearing 17 constituting part of or on the framework 8. Said pinion 16 is in constant mesh with the bevel gear 18 loose on the relatively stationary stud shaft 19 supported by the framing 8 and extending transversely to the shaft 4. The bevel gear 18 is rigid with a second bevel gear 20; in fact said gears may as shown be made integral. From the statements made it will be clear that the gears 18 and 20 rotate about relatively stationary or fixed axes; that is to say, said gears 18 and 20 do not revolve as do those found in planetary gearing. The gear 20 is in constant mesh with the gear 21 supported by the bearing 22 which is rigid with the framing 8. Said gear 21, however, surrounds the shaft 4 although as with the gear 16 it is not directly supported thereby. It will be remembered that the hub of the pinion 11 has been described as elongated and this hub preferably supports a clutch member as 23 the latter being splined to the former, the purpose of said clutch member 23 being to clutch the pinion 11 to the gear 21 and when this occurs and when the pinion 16 is clutched to the shaft 4 by a clutch as 24 the axle 2 will be driven at its lowest forward speed, the drive being as follows: from the shaft 4 to the clutch member 24 which is splined to said shaft 4, pinion 16, gear 18, gear 20, gear 21, clutch 23, pinion 11, gear 6, differential mechanism 3, and axle 2. In securing this third or low speed, it is necessary with the construction described to operate both clutches 23 and 24 to put them simultaneously into clutching relation with the coöperating gears 11 and 16, respectively, although it is not necessary that said clutches 23 and 24 be actually shifted in unison or simultaneously. The means shown for operating said two clutches will be hereinafter described and they are preferably shifted simultaneously.

The reversing mechanism will now be set forth, and it might be well to indicate that in the organization illustrated both said clutches 23 and 24 are brought into action in such a case, the parts being of such nature that the rotation of the axle will be reversed at such time.

Surrounding the shaft 4 is a bevel pinion 25 sustained by a bearing 26 fastened to the framing 8 and it will be evident that when this pinion is put into clutched relation with said shaft the latter will be driven in a direction opposite to that in which it is turned when the pinion 16 is clutched thereto. Said pinion 25 is coöperative with the clutch 24 to which I have already referred, and it is in constant mesh with the gear 18. It will be assumed that the car is being driven at its low speed and that it is necessary to reverse the motion of the same. To accomplish this result the clutch member 24 is engaged with the hub of the pinion 25 and the clutch member 23 being already in engagement with the gear 21 the direction of travel of the vehicle will be reversed the drive being then as follows: from shaft 4, to clutch-member 24, pinion 25, gears 18, 20 and 21, clutch member 23, pinion 11, gear 6, differential mechanism 3 and axle 2.

As a convenient means for operating the clutch member 14 I have shown the shifter 27 which may as shown consist of an endwise, reciprocatory non-rotative rod provided with an arm 28 forked at its free end to straddle the peripheral portion of said clutch member 14, said rod being moved back and forth to shift the clutch member 14 to put the same into engagement with the pinion 9 to secure the high speed, to put it into engagement with the pinion 11 to obtain the intermediate speed, or to throw it into its neutral position as shown to throw both the high and intermediate speed mechanisms out of effective relation, such for example as would be done to operate the car forwardly at its low speed.

As I have already indicated the clutch member 24 is operated in opposite directions from its neutral position to alternately put the pinions 16 and 25 into clutching relation with the shaft 4 to drive the car forward at its slow speed or to reverse the same and during both of these conditions the clutch 23 should be in engagement with the gear 21 and I provide mechanism as will now appear to move the said clutch 23 into engagement with said gear 21 irrespective of the movement of the clutch member 24 on the shifting of the latter.

The framing 8 supports an endwise, reciprocatory, non-rotative rod 29 constituting a convenient clutch-shifting device being provided with an arm 30 fitting a peripheral channel in the clutch member 24 so that when said rod is moved endwise the clutch member 24 can be put into clutching relation with either of the pinions 16 and 25. Fastened to the rod 29 near the outer end thereof is a sleeve 31 having a V-slot 32 to receive a pin 33 on one arm of the angle lever 34 the other arm of said angle lever being loosely connected with the sleeve 35 slidably supported by said rod 29, said angle lever being supported for swinging movement at its angle within the casing or frame 8, and said sleeve 35 having an arm 36 the outer end of which fits a circumferential channel in the clutch member 23. When the clutch-member 24 is in its neutral position as shown in the drawings the pin 33 will be at the junction of the branches of the V-shaped slot 32 and it does not matter whether the clutch member 34 is moved toward the right or left from its said neutral position, the clutch member 23 will be moved always and positively into engagement with the gear 21 on the movement of the rod 29 to shift the clutch 24 as set forth.

What I claim is:

1. The combination of a driven shaft, a driving shaft, a pair of gears surrounding said driving shaft, a pair of gears in mesh with the other pair of gears and connected with said driven shaft, the gears of one pair being of different diameters, means for alternately putting the gears of the first pair into driving relation with said driving shaft, a gear surrounding said driving shaft, speed modifying and reversing means coöperative with said last mentioned gear, means for alternately putting a member of the speed modifying and reversing means into driving relation with said shaft, and means for throwing said last mentioned gear into and out of driving relation with one of said first mentioned gears.

2. The combination of a driven shaft, a driving shaft, a pair of gears surrounding said driving shaft, a pair of gears of different diameters, in mesh with the other pair of gears and connected with said driven shaft, means for alternately putting the gears of the first pair into driving relation with the driving shaft, a gear surrounding said driving shaft, speed modifying and reversing means coöperative with said last mentioned gear, means for putting a member of the speed modifying and reversing means alternately into driving relation with said shaft, and means for throwing the last mentioned gear into and out of driving connection with one of said first mentioned gears.

3. The combination of a driven member, a pair of gears, a second pair of gears in mesh with the other pair of gears and connected with said driven member, the gears of one pair being of different diameters, means for alternately putting the gears of the first pair into driving relation with a source of power, a gear, speed modifying and reversing means connected with said last mentioned gear, means for alternately putting a member of the speed modifying and reversing means into effective action, and means for throwing said last mentioned gear into and out of operative relation with one of said first mentioned pair of gears.

4. The combination of a driven member, a driving shaft, a pair of gears surrounding said driving shaft, a pair of gears in mesh with the other gears and connected with said driven member, the gears of one pair being of different diameters, means for alternately clutching the gears of the first pair to said shaft, a transmitting gear loosely surrounding said shaft, means for putting said transmitting gear into and out of driving relation with one of said first mentioned pairs of gears, speed modifying and reversing means coöperative with said transmitting gear and including gears loosely surrounding said shaft, and means for alternately clutching said last mentioned gears to said shaft.

5. The combination of a source of power, a driven member, a gear connected with said driven member, a second gear in mesh with the first gear, means for clutching said second gear to said source of power, a third gear, means for clutching together the second and third gears, a fourth gear, a fifth gear, both fourth and fifth gears being in constant driving connection with said third gear, and means for clutching said fourth and fifth gears alternately to said source of power and during the time the second and third gears are clutched to each other.

6. Driving mechanism comprising a clutch movable in opposite directions from a neutral position, a shifting device for shifting said clutch oppositely from said neutral position, a second clutch, a shifting device for the second clutch supported by the first shifting device, and a swinging lever connected at one end with said second shifting device the first shifting device having a projection having a V-slot and the said lever having at its other end a pin to enter said slot.

7. Driving mechanism comprising a driven member, a gear connected to said driven member, a second gear in mesh with the other gear, a source of power, means for clutching the said second gear to the source of power to thereby operate said driven member from said source of power, a third gear, a fourth gear, means for clutching the fourth gear to said source of power, means for transferring the power of said fourth gear to said third gear, and means for clutching the third and second gears to each other when the fourth gear is clutched to said source of power.

8. Driving mechanism comprising a shaft, a gear surrounding said shaft, speed modifying and reversing means operatively connected with said gear and comprising gear also surrounding said shaft, means for alternately clutching the gears of the speed modifying and reversing means to said shaft, a fourth gear also surrounding said shaft, and means for clutching together the first and fourth gears when either the said gears of the speed modifying and reversing means is clutched to said shaft.

9. Driving mechanism comprising a gear, a second gear, speed modifying and reversing means operatively connected with the first gear and including gears, means for alternately connecting the gears of the speed modifying and reversing means with a source of power, a fourth gear, means for directly clutching together the first and fourth gears when either of the gears of the speed modifying and reversing means is clutched to said source of power, and independent means for clutching the fourth gear to said source of power.

10. Driving mechanism comprising a beveled gear, a second beveled gear, a third beveled gear, means for alternately connecting the second and third beveled gears with a source of power, a fourth beveled gear in mesh with both the second and third beveled gears, a fifth beveled gear rotatively connected with the fourth beveled gear and in mesh with the first beveled gear, a sixth gear, and means for clutching the sixth gear to the first gear.

11. Driving mechanism comprising a power-operated shaft, a gear surrounding said shaft, means for clutching said gear to said shaft, a second gear surrounding said shaft, means for clutching said two gears together, speed-modifying and reversing means, and means for alternately putting members of said speed modifying and reversing means into power-transferring relation with said second gear.

12. Driving mechanism comprising a power-driven shaft, a gear surrounding said shaft and movable relatively thereto, means for clutching said gear to said shaft, a second gear surrounding the shaft and movable relatively thereto, means for clutching said two gears together, separate gears operatively connected with said second gear and surrounding said shaft, and means for alternately clutching said separate gears to said shaft.

13. Driving mechanism comprising a pair of gears, a clutch for alternately throwing said gears into operative relation with a source of power, a third gear, means for transferring the effects of the other gears to said third gear, a fourth gear, a clutch rotatively connected with the fourth gear and mechanism for moving the first clutch in either direction and for simultaneously always moving the second clutch in the same direction.

14. Driving mechanism comprising a driven member, a shaft, a gear surrounding said shaft, a second gear also surrounding said shaft, means for clutching the first and second gears together, means for transferring the effect of said second gear to said driven member, speed modifying and reversing means, and means for alternately putting the members of said speed modifying and reversing means into operative relation with said first gear and while said first and second gears are connected together.

15. Driving mechanism comprising a gear, a second gear coaxial with the first gear, means for directly clutching together the first and second gears, speed modifying and reversing means, and means for alternately putting members of the speed modifying and reversing means into driving relation with said first gear and while the first and second gears are clutched to each other.

16. Driving mechanism comprising a shaft, a gear surrounding said shaft, a second gear also surrounding the shaft, means for clutching said gears together, a driven member, means for transferring the effect of said second gear to said driven member, means for clutching said second gear to said shaft, speed modifying and reversing means comprising gears surrounding said shaft and operatively connected with said first gear, and means for alternately clutching the gears of said speed modifying and reversing means to said shaft.

17. Driving mechanism comprising a shaft, a gear surrounding said shaft, a second gear also surrounding said shaft, means for clutching said first and second gears to each other, a third gear in mesh with said second gear, a driven member operable by said third gear, means for clutching said second gear to said shaft, a fourth gear, a fifth gear, operative connections between said fourth and fifth gears and said first gear, and means for alternately clutching said fourth and fifth gears to said shaft and while said first and second gears are clutched to said shaft.

In testimony whereof I affix my signature in presence of two witnesses.

WALTER O. FOSS.

Witnesses:
JOSEPH R. BARLOW,
F. E. ANDERSON.

Copies of this patent may be obtained for five cents each, by addressing the "Commissioner of Patents, Washington, D. C."